United States Patent [19]
Galloway et al.

[11] Patent Number: 6,097,293
[45] Date of Patent: Aug. 1, 2000

[54] PASSIVE ELECTRICAL MARKER FOR UNDERGROUND USE AND METHOD OF MAKING THEREOF

[75] Inventors: George G. Galloway, Weatherford; Ronald L. McWilliams, Mineral Wells; John Moss, Weatherford; Kenneth D. Napps, Mineral Wells; Sean Nash, Arlington; Paul R. Siglinger, Weatherford; William C. Wood, Fort Worth, all of Tex.

[73] Assignee: Industrial Technology, Inc., Mineral Wells, Tex.

[21] Appl. No.: 09/292,135

[22] Filed: Apr. 15, 1999

[51] Int. Cl.[7] .................................................. G08B 13/14
[52] U.S. Cl. .............................. 340/572.8; 340/572.2; 340/572.5; 340/572.7; 343/742; 343/867; 342/51; 235/493
[58] Field of Search .............................. 340/572.8, 572.1, 340/572.4, 572.7, 572.5, 572.2; 342/51; 343/742, 867; 235/493

[56] References Cited

U.S. PATENT DOCUMENTS

| | | | |
|---|---|---|---|
| 3,683,389 | 8/1972 | Hollis | 343/788 |
| 3,689,885 | 9/1972 | Kaplan et al. | 340/825.34 |
| 3,719,950 | 3/1973 | Bukhman et al. | 343/788 |
| 3,818,487 | 6/1974 | Brody et al. | 340/407.1 |
| 3,836,842 | 9/1974 | Zimmermann et al. | 324/239 |
| 3,938,044 | 2/1976 | Lichtblau | 340/572.3 |
| 3,983,552 | 9/1976 | Bakeman, Jr. et al. | 340/572.2 |
| 4,118,693 | 10/1978 | Novikoff | 340/572.7 |
| 4,119,908 | 10/1978 | Cosman et al. | 324/326 |
| 4,240,072 | 12/1980 | Fowler | 340/664 |
| 4,260,983 | 4/1981 | Falck et al. | 340/572.4 |
| 4,292,590 | 9/1981 | Wilson | 324/226 |
| 4,293,816 | 10/1981 | Johnson | 324/329 |
| 4,334,227 | 6/1982 | Marks | 343/719 |
| 4,342,904 | 8/1982 | Onasager | 235/493 |
| 4,482,513 | 11/1984 | Auletti | 264/39 |
| 4,581,524 | 4/1986 | Hockman et al. | 235/493 |
| 4,668,912 | 5/1987 | Junker | 324/220 |
| 4,712,094 | 12/1987 | Bolson, Sr. | 340/572.5 |
| 4,761,656 | 8/1988 | Cosman et al. | 343/719 |
| 4,859,991 | 8/1989 | Watkins et al. | 340/572.2 |
| 4,873,530 | 10/1989 | Takeuchi et al. | 343/711 |
| 4,894,663 | 1/1990 | Urbish et al. | 343/702 |
| 4,925,605 | 5/1990 | Petronko | 264/46.6 |
| 5,047,715 | 9/1991 | Morgenstern | 324/207.17 |
| 5,057,844 | 10/1991 | Rothstein | 342/51 |
| 5,103,234 | 4/1992 | Watkins et al. | 343/742 |
| 5,121,103 | 6/1992 | Minasy et al. | 340/551 |
| 5,140,334 | 8/1992 | Snyder et al. | 343/773 |
| 5,258,766 | 11/1993 | Murdoch | 343/742 |
| 5,276,067 | 1/1994 | Doerge | 521/131 |
| 5,280,296 | 1/1994 | Tan et al. | 343/718 |
| 5,281,941 | 1/1994 | Bernstein | 336/188 |
| 5,319,354 | 6/1994 | Myatt | 340/572.7 |
| 5,397,986 | 3/1995 | Conway et al. | 324/243 |
| 5,426,443 | 6/1995 | Jenness, Jr. | 343/781 P |
| 5,497,099 | 3/1996 | Walton | 324/641 |
| 5,499,015 | 3/1996 | Winkler et al. | 340/572.2 |
| 5,539,421 | 7/1996 | Hong | 343/895 |
| 5,585,811 | 12/1996 | Jetzer | 343/867 |
| 5,592,182 | 1/1997 | Yao et al. | 343/742 |
| 5,699,048 | 12/1997 | Galloway | 340/572.5 |
| 5,814,986 | 9/1998 | Goskowicz et al. | 324/207.26 |

Primary Examiner—Benjamin C. Lee
Attorney, Agent, or Firm—Geoffrey A. Mantooth

[57] ABSTRACT

A passive electrical marker has tuned circuits, each of which includes a coil and a capacitance. The tuned circuits are oriented with respect to each other in a predetermined arrangement so as to provide a broader spatial response. A foamed core inside of the tuned circuits maintains the tuned circuits in their respective orientations and protects the tuned circuits from mechanical shock. A shell or housing around the foamed tuned circuits provides environmental protection to the tuned circuits. The tuned circuits can be foamed together in a mold and then placed into the housing. Alternatively, the tuned circuits can be foamed together inside of a housing, which housing maintains the orientations between the tuned circuits during foaming. As still another alternative, the housing can be applied to the outside of the foamed tuned circuits as a coating.

24 Claims, 5 Drawing Sheets

PASSIVE ELECTRICAL MARKER FOR UNDERGROUND USE AND METHOD OF MAKING THEREOF

SPECIFICATION

1. Field of the Invention

The present invention relates to passive electrical markers for underground use and the methods of making such markers.

2. Background of the Invention

Buried structures include pipelines, cables, etc. Once a structure is buried in the ground, it becomes difficult to locate. Location is useful, for example, to dig up the structure for repair or to avoid the structure when performing nearby excavation.

Passive electrical markers are used to locate buried structures. The markers are located adjacent to a structure and then buried with that structure.

Each marker contains one or more tuned LC circuits. Each LC circuit includes a coil of wire that forms the inductive element and a capacitor to form the capacitive element.

The markers operate at discrete frequencies. Different utilities use different frequencies to allow for position detection and marking. For example, telephone companies use one frequency of markers to mark their buried cables, while electrical power companies use another frequency of markers to mark their buried cables.

Once the marker is buried in the ground with the structure, it can be located again by using a detector apparatus. The detector has a transmitter that provides an electromagnetic signal tuned to the frequency of the LC circuit. Upon receiving the electromagnetic signal, the LC circuit inside of the marker resonates and produces an electromagnetic response. The detector apparatus also has a receiver that detects this response from the marker. The receiver converts the marker's response into a signal that is detectable by the operator (for example, an audio tone). The operator marks the pinpointed location on the ground using paint and then moves on to find the next marker buried along the structure.

One of the problems with buried markers was the directionality of the response. The tuned circuit in a marker produces a response in the shape of a dipole pattern. Thus, if the tuned circuit was properly oriented, such that the dipole response pointed up toward the ground surface, then the marker could easily be found by the detector. However, if the tuned circuit was not properly oriented, the dipole response would be pointed at some angle to the ground surface, making detection difficult, if not impossible. Due to the angularity of the response, even if the marker could be detected, there was no assurance that the marker would be directly underneath the ground location or some distance away in some unknown direction. Thus, the resolution of locating such a marker was somewhat poor.

This directionality problem was solved by two inventions. The first solution is shown in Bolson, U.S. Pat. No. 4,712,094. The LC circuit remains horizontal because it floats on a liquid surface. The second solution is shown in Galloway, U.S. Pat. No. 5,699,048. Plural LC circuits inside the marker provide an omnidirectional response.

It is the Galloway invention that the present invention is directed. Tuned circuits are fragile. If a marker is dropped onto a hard surface, the mechanical shock may be sufficient to either damage the capacitor, deform the shape of the coil or break the electrical connection between the capacitor and the coil. Such changes to the tuned circuit result either in a degradation of performance or making the tuned circuit inoperable.

In the prior art, various attempts have been adopted to mechanically protect the tuned circuits against shock. In Marks, U.S. Pat. No. 4,334,227, the coil and capacitor are encased in rigid plastic. The structure of the marker itself, which is hoop shaped with webbing, provides the mechanical strength to minimize coil distortion. In Bolson, U.S. Pat. No. 4,712,094, and perhaps even in Cosman, U.S. Pat. No. 4,761,656, the coil is contained in a disk shaped structure. Although the patents themselves do not teach it, in practice, disk shaped pieces of foam have been provided inside of the coil for what is believed to be shock absorbing purposes. The foam is soft and provides only limited shock absorption protection. The foam is not coupled to the coil and is in practice smaller in its outside diameter than the inside diameter of the coil. Thus, the foam is not coupled to the coil.

In addition, when plural tuned circuits are used, they are aligned with respect to each other within relatively close tolerances in order to optimize the omnidirectional response. Maintaining the alignment of the tuned circuits with respect to each other is desirable in order to maintain the spatial response.

Another consideration is the cost of markers. The markers are buried and then forgotten until the structure is dug up. In some areas, a marker may be located every few feet. Because the markers are buried and because large quantities are used, there is an economic incentive to minimize the cost of markers. Therefore, production techniques that reduce the cost are desirable.

SUMMARY OF THE INVENTION

It is an object of the present invention to provide a passive electrical marker having at least one tuned circuit that is protected from mechanical shock.

It is another object of the present invention to provide a passive electrical marker having plural tuned circuits, which tuned circuits are maintained in alignment with each other.

It is another object of the present invention to provide a method of manufacturing a passive electrical marker with at least one tuned circuits that is inexpensive.

The present invention provides a passive marker for use in locating buried structures. The marker includes a tuned circuit comprising a coil of wire connected to a capacitance. The coil has an interior space. The interior space of the coil comprises a rigid foam. A shell is located around an exterior of the tuned circuit and the foam. The shell is waterproof. The tuned circuit is electrically insulated from the exterior of the shell.

In accordance with one aspect of the present invention, the foam contacts an inside diameter of the coil. In accordance with another aspect of the present invention, the foam at least partially encompasses the capacitance. By contacting the coil and encompassing the capacitance, the foam provides protection of the tuned circuit against mechanical shock. Such mechanical shock can be experienced, for example, if the tuned circuit is dropped.

In accordance with another aspect of the present invention, the shell is hard.

In accordance with still another aspect of the present invention, the shell compresses at least a portion of the foam when the shell is located around the tuned circuit. By compressing portions of the foam, the foam, and thus the tuned circuit, is clamped inside of the shell, wherein the tuned circuit will not rattle inside of the shell.

There is also provided a method of making a passive marker for locating buried structures. The method provides a tuned circuit comprising an inductance and a capacitance. The tuned circuit has an interior. The tuned circuit is placed in a confined space. The interior of the tuned circuit is foamed to fill the confined space. The foamed tuned circuit is enclosed within a waterproof shell. The tuned circuit is electrically insulated from an exterior of the shell.

In accordance with one aspect of the invention, the tuned circuit is placed inside of a mold and the mold is closed. The step of foaming the interior of the tuned circuit further comprises foaming the inside of the mold. The foamed tuned circuit is removed from the mold and the foamed tuned circuit is placed into the shell and the shell is sealed.

In accordance with another aspect of the present invention, the tuned circuit is placed inside of a mold and the mold is closed. The inside of the mold is foamed, and the foamed tuned circuit is then removed from the mold. The foamed tuned circuit is coated with a protective covering material, which is allowed to harden.

There is also provided a method of making a passive marker for locating buried structures, which method provides a tuned circuit comprising an inductance and a capacitance. The tuned circuit has an interior. The tuned circuit is placed into a shell interior and the shell is closed. The interior of the shell and the tuned circuit is foamed. The shell is sealed in a waterproof manner.

There is also provided a passive marker having two or more tuned circuits, with each of the tuned circuits comprising an inductance and a capacitance. Each of the inductances has a center and an axis extending through the center. The tuned circuits are concentric to each other and are oriented such that the axes are angled with respect to each other. The tuned circuits are coupled together in the orientation by foam. A shell is formed around an exterior of the tuned circuits and the foam.

In accordance with one aspect of the present invention, the tuned circuits are electrically insulated from an exterior of the shell.

In accordance with another aspect of the present invention, the foam contacts at least an inside diameter of each of the tuned circuits.

In accordance with another aspect of the present invention, the foam has a density ranging between 0.5–1.5 pounds per cubic foot.

The present invention also provides a method of making a passive marker comprising providing two or more tuned circuits, which each tuned circuit comprising a loop. Each loop has an interior space. The tuned circuits are positioned in a predetermined orientation with respect to each other such that a portion of the interior spaces are shared between the tuned circuits. The interior spaces are filled with a foam. The foam makes contact with the tuned circuits. A shell is located around the tuned circuits and the foam.

DESCRIPTION OF THE PREFERRED EMBODIMENT

Figure 1:
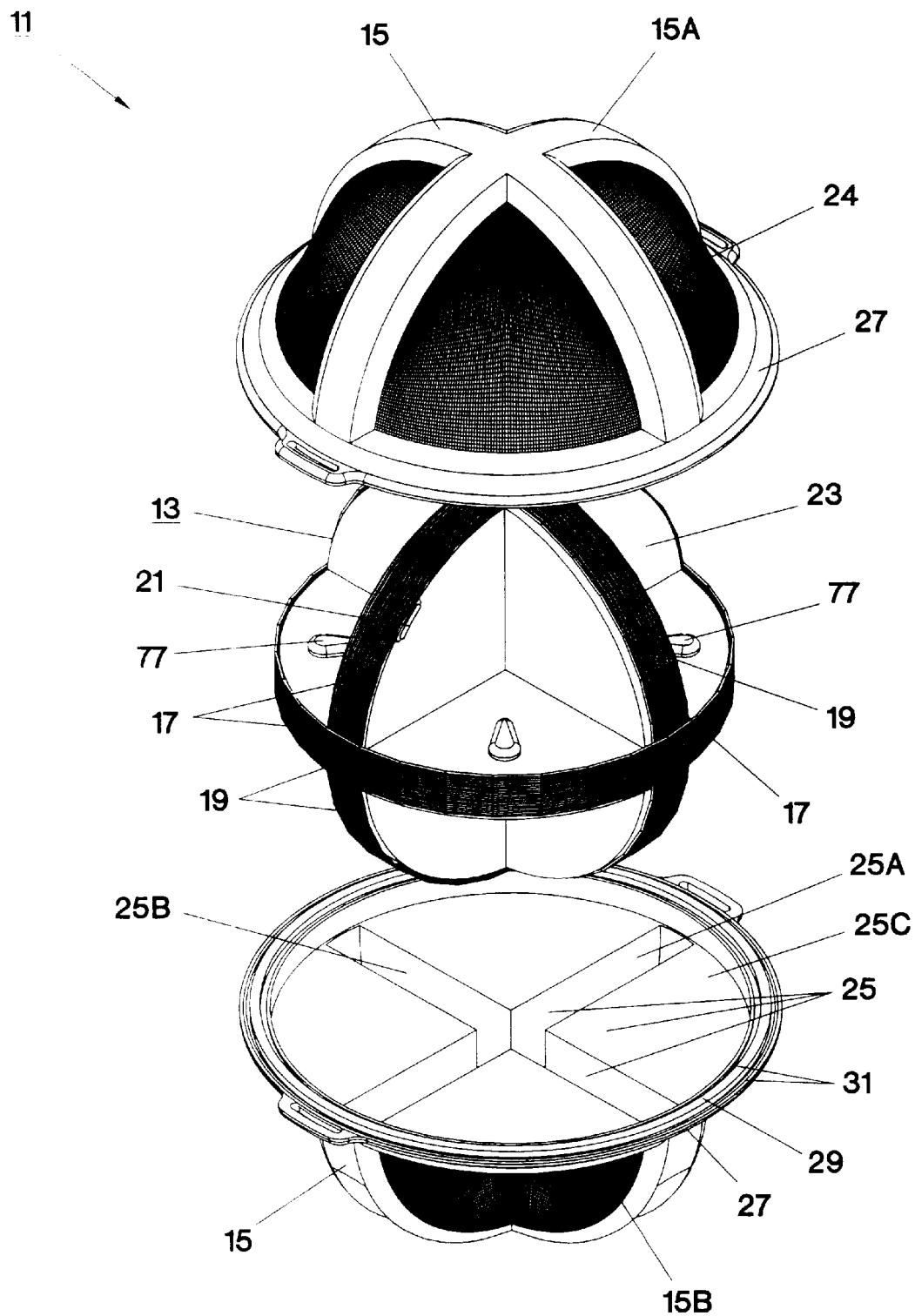
FIG. 1 is an exploded isometric view of the marker of the present invention, in accordance with a preferred embodiment.

In FIG. 1, there is shown an isometric exploded view of the marker 11 of the present invention, in accordance with a preferred embodiment. The marker has a tuned circuit subassembly 13 located within a housing 15 or enclosure.

The tuned circuit subassembly 13 has three tuned circuits 17 that are oriented with respect to each other so as to produce an omnidirectional spatial response. Such a tuned circuit arrangement is shown and described in U.S. Pat. No. 5,699,048, the disclosure of which is incorporated herein by reference.

Each tuned circuit 17 has an inductance 19 and a capacitance 21. In the preferred embodiment, the inductance 19 is a coil of copper wire with an air core. The coils 19 are all the same size.

The capacitance 21 is provided by a discrete capacitor. Each capacitor 21 is electrically connected across the two ends of the respective coil wire. In the preferred embodiment the capacitor 21 is located within the inside diameter of the respective coil 19. Together, the coil and the capacitor make up a tuned circuit 17 that is tuned to a particular frequency.

In the preferred embodiment, the particular frequency of the tuned circuit is determined by the value of the capacitor and the inductor. The physical dimensions (wire, number of turns, diameter) of the coil are preferably unchanged from one frequency to another. This is so as to allow the use of one size housing for all frequencies of tuned circuits. Thus, to make a tuned circuit of one frequency, a capacitor having a first capacitance is connected across a standard sized coil. To make a tuned circuit of another frequency, a capacitor having a second capacitance is connected across another standard sized coil. The frequency may be between 50 KHz–8 MHz. However, the physical dimensions of the coil can be changed to vary the particular frequency of the LC circuit if so desired.

To provide an omnidirectional response pattern, three tuned circuits are oriented orthogonally to each other. Each coil has an axis that extends perpendicularly to the plane containing the coil. The coils, and thus the tuned circuits themselves, are oriented orthogonally to each other. Thus, the tuned circuit subassembly 13 shown in FIG. 1 produces a spherical or omnidirectional pattern. The three tuned circuits 17 are concentric to each other.

The tuned circuit subassembly 13 includes the three tuned circuits 17 and a foamed core 23. The foamed core 23 contacts at least the inside diameters of the coils 19 and generally encloses the capacitors 21. The foamed core 23 couples the three tuned circuits 17 together. In addition, the three tuned circuits are maintained in their respective orientations by the foam. In the preferred embodiment, the foam forms a core because the foam is located inside of the tuned circuits.

The foam is nonconductive and is relatively rigid. In the preferred embodiment the foam is polyurethane and has a density of 0.8 pounds per cubic foot. Other densities of foam could be used, for example, 0.3–40 pounds per cubic foot. In addition, other types of nonconductive foam could be used, for example, polyethylene, polyester, phenolic, plastic, thermoplastic, polyimide, polystyrene, polyvinyl chloride, reticulated, silicone and syntactic foam.

The core 23 is formed by allowing the foaming chemicals to foam and expand inside of the tuned circuits, thereby making contact with the inner circumference of the coils and encompassing, at least partially, the capacitors. In some instances, the foam can expand outwardly beyond the coils, thereby encompassing the coils as well.

The rigidity of the foam maintains the circularity 14 of the individual coils, maintains the three coils in the orthogonal orientation, and protects the tuned circuits from mechanical shock (such as being dropped onto a ground surface).

Figure 2:
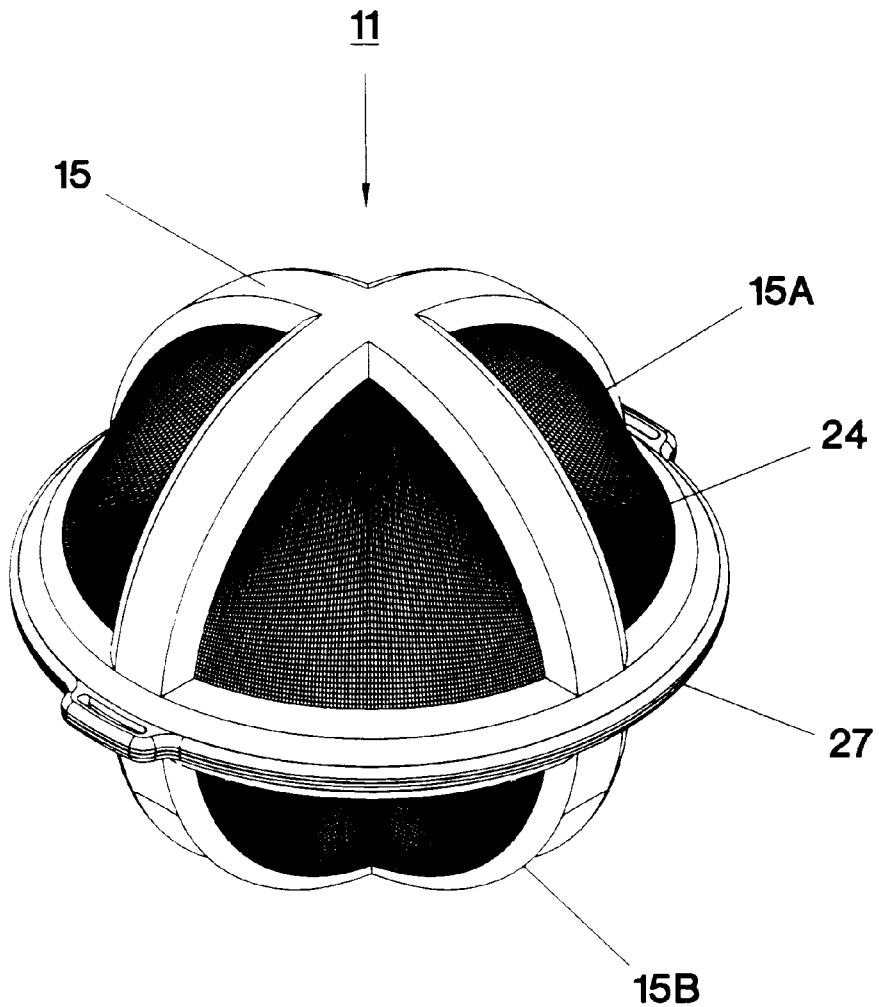
FIG. 2 is an isometric view of the assembled marker.

The tuned circuit subassembly 13 is placed into the housing 15. The housing encloses the tuned circuit subassembly (see FIG. 2), protecting the tuned circuits from the environment exterior thereto. The markers are buried in the ground. The housing is sufficiently rigid so as to withstand the weight of soil. In the preferred embodiment, the housing 15 is made up of first and second hemispherical portions 15A, 15B. The portions are not truly hemispherical, having indented regions 24. The housing portions are plastic or some other nonconductive material. In the preferred embodiment, the housing is a hard thermoplastic.

The housing 15 forms a hollow enclosure. When the portions are assembled, there are three orthogonal disc shaped cavities 25 therein so as to receive the tuned circuit subassembly and to assist in maintaining the orthogonal relationship of the tuned circuits. Thus, there are first, second, and third cavities 25A, 25B, 25C. The cavities are formed by the inside surface of the housing portions.

To describe the cavities, the housing will be referred to in the orientation shown in FIG. 1. The first and second cavities 25A, 25B are vertical, while the third cavity 25C is horizontal. Each cavity receives a respective tuned circuit and any foam that is associated with that tuned circuit. The cavities serve to minimize movement of the tuned circuits inside of the housing. The housing could be spherical. If so, the tuned circuits could be secured inside of the housing by channels or by foam compression.

The first and second housing portions 15A, 15B each have a rib 27 that extends radially outward in a horizontal direction. Each rib 27 has an annular lip 29 located within a channel 31. The housing portion lips 29 contact each other when the housing portions 15A, 15B are assembled, and serve to couple and seal the housing portions together.

The method of making the marker will now be described. In accordance with the preferred embodiment, the tuned circuit subassembly 13 is made and placed into the housing 15, which is then sealed (see FIG. 2).

More specifically, to make the tuned circuit subassembly 13, the individual tuned circuits 17 are made. Each coil 19 is made of wire wrapped around a mandrel. Heat is applied to couple the individual turns of wire together. The coil is then taken off the mandrel. A capacitor is soldered to the free ends of the coil. The capacitor is preferably located in the inside of the coil. The capacitor is maintained in its position by the stiffness of its leads and, after foaming, by the foam. Each tuned circuit is a stand alone circuit.

Figure 3:
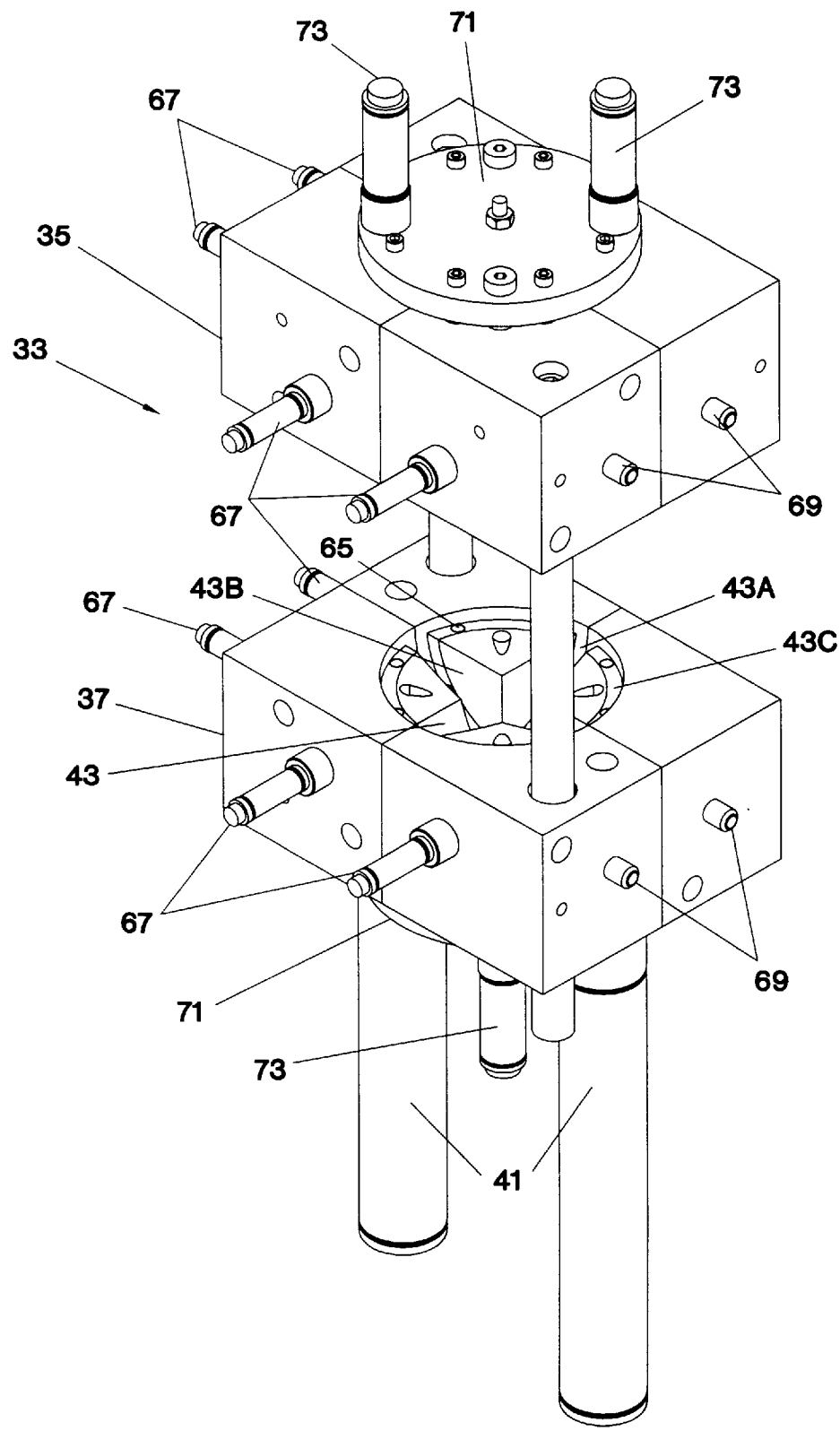
FIG. 3 is an isometric view of the open mold used to form the tuned circuit subassembly.
Figure 4:
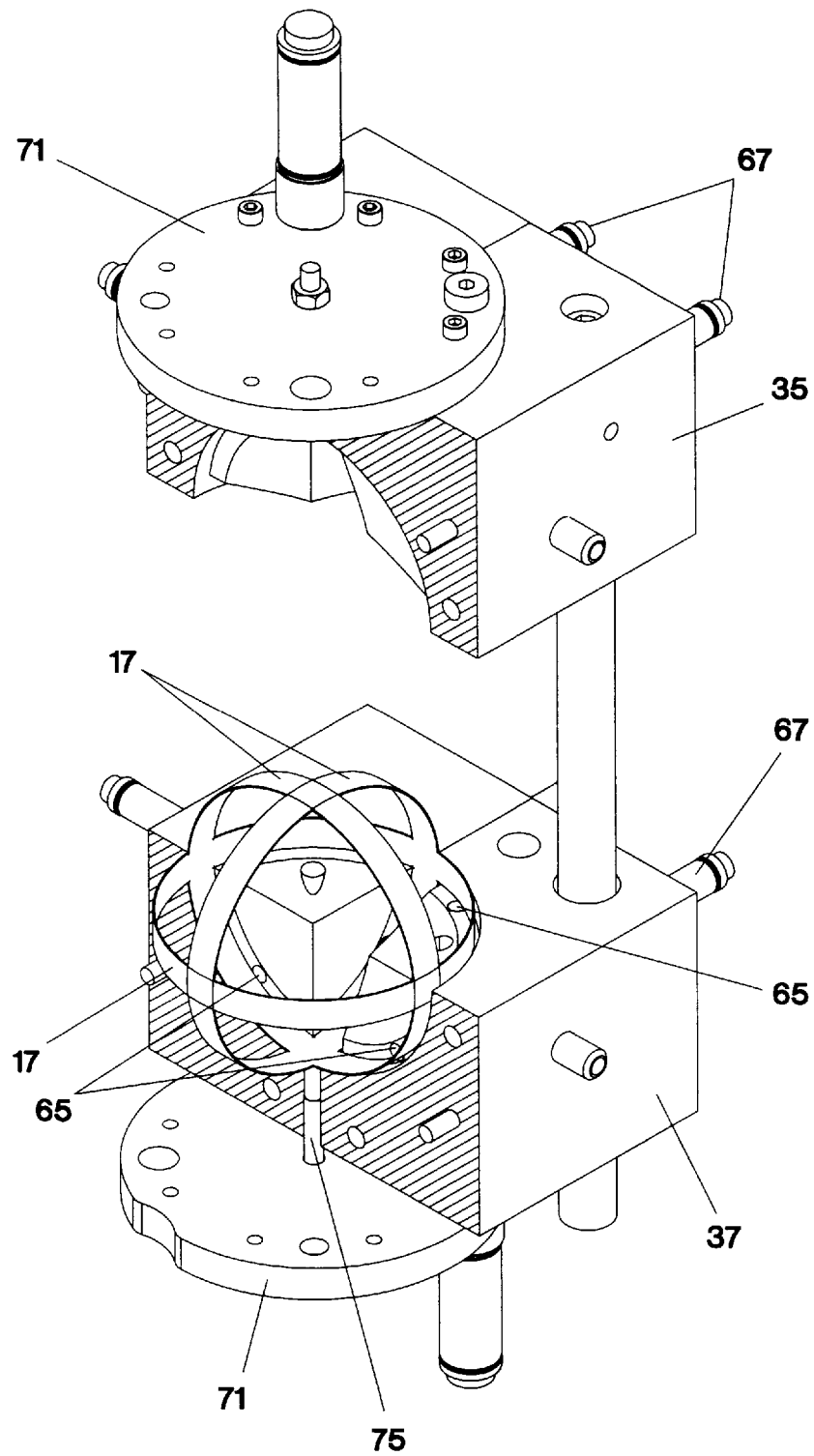
FIG. 4 is an isometric cross-sectional view of the mold of FIG. 3, showing tuned circuits located inside.
Figure 5:
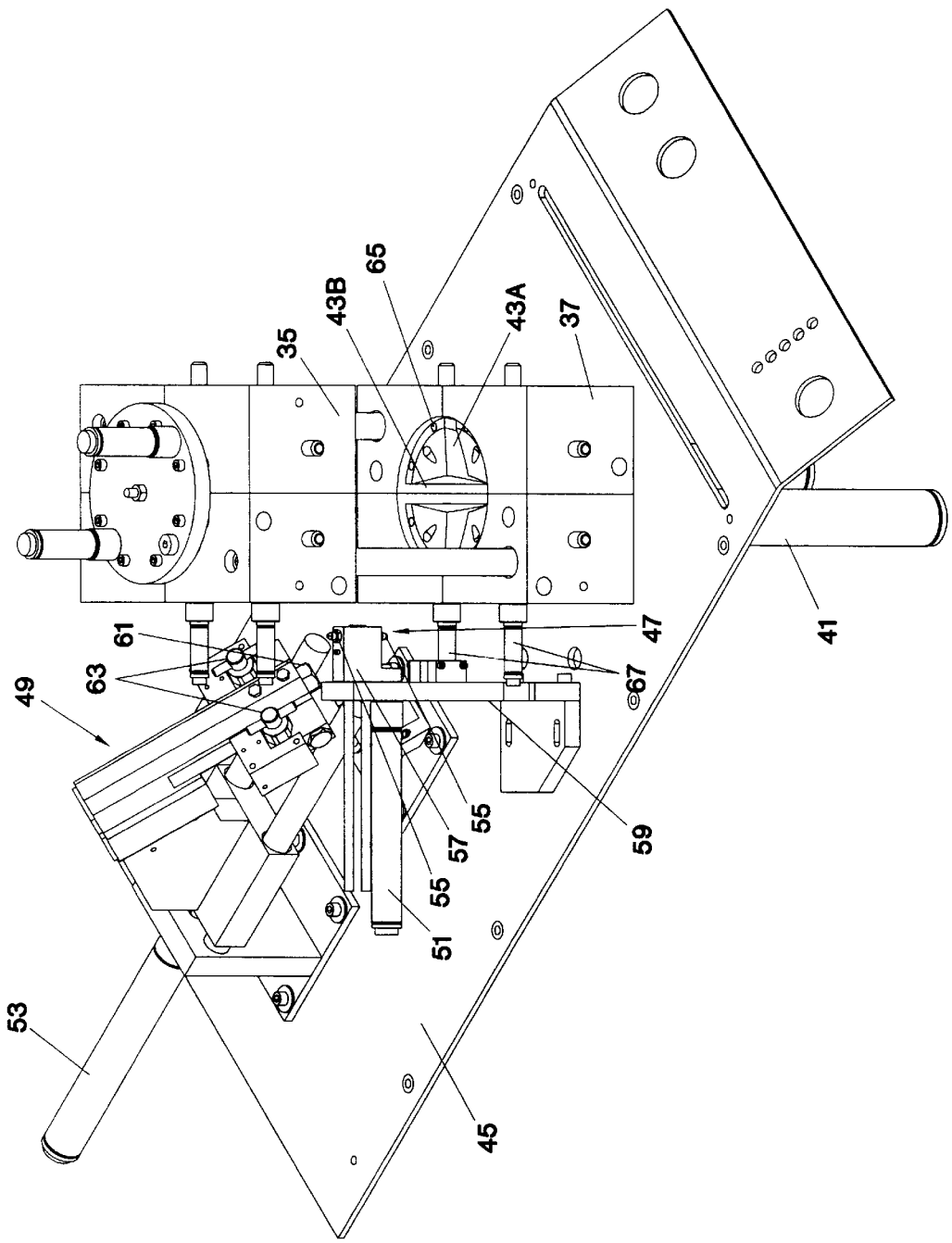
FIG. 5 is an isometric view of the mold, with ancillary equipment.

The tuned circuits are used to form the tuned circuit subassembly with the assistance of a mold 33 (see FIGS. 3–5). The tuned circuits are placed into the mold 33 and the foam is provided therein to make the foamed core.

The mold 33 has two blocks, namely an upper block 35 and a lower block 37. Each block has a cavity 43 therein. The upper block 35 can move with respect to the lower block 37 so as to open and close the mold. When the mold is closed, the two blocks are together. When the mold is open, the two blocks are apart. Piston actuators 41 are provided to move the upper block 35 between the open and closed positions.

When the mold is closed, the resulting interior cavity 43 is shaped like three disk cavities 43A, 43B, 43C, which are concentric and orthogonal to each other. As can be seen in FIGS. 3 and 5, the individual disk cavities 43A, 43B, 43C bulge in their centers. That is to say that the thickness of an individual disk cavity is greater near the center of the disk cavity than at its circumference. This taper allows the tuned circuits to be more easily placed into the mold.

When the mold 33 is opened, three tuned circuits 17 are placed in the lower block 37. Each tuned circuit is placed into a different disk cavity 43A, 43B, 43C of the lower block 37. The respective coils are located at the circumference of the respective disk cavities. As shown in FIG. 4 (where the mold is shown in cross-section), the tuned circuits 17 are arranged in an orthogonal and concentric array. An interior space is formed inside of the tuned circuit array.

The lower mold block 37 is mounted on a table 45. Also mounted on the table 45 is a mold release delivery system 47 and a foam delivery system 49. The delivery systems 47, 49 move between extended and retracted positions. In the respective extended position, the respective delivery system can deliver fluid into the mold cavities. In the respective retracted position, the delivery system is pulled back from the mold, thereby allowing the mold to close. Pneumatic actuators 51, 53 move the delivery systems 47, 49 between the extended and retracted positions.

The mold release delivery system 47 has upper and lower heads 55. The heads 55 are mounted on a block 57, which block moves between the extended and retracted positions. The block 57 and heads 55 are shown in the extended position in FIG. 5. The mold release delivery system 47 is mounted onto a bracket 59, which bracket is mounted to the table 45. The respective pneumatic actuator 51 moves the block 57 between the extended and retracted positions. The heads are connected to a supply of lubricant that is located off of the table.

The foam delivery system 49 has a mixing nozzle 61 and a metering arrangement 63. The foam that is used is conventional and commercially available. The foam is generated by combining two foaming components together, for example, a polyol component and an isocyanate component. Examples of rigid polyurethane foams can be found in U.S. Pat. Nos. 5,276,067 and 4,925,605. The metering arrangement 63 controls the amount of the foaming components that are applied to the mold via the nozzle 61, while the nozzle 61 mixes the two foaming components together. The metering arrangement is connected to supplies of the foaming components which are kept separate from each other. The foaming components are mixed together at the nozzle and delivered to the mold, wherein foam is generated.

The nozzle 61 is oriented so as to extend into the mold without contacting the tuned circuits located therein. Thus, the nozzle moves into the mold at a location that is between the two vertical tuned circuits.

The mold blocks have retractable alignment pins 65 (see FIG. 4). The pins 65 align the coils 19 to allow the mold upper block to be closed down onto the mold lower block 37 without crushing or deforming a coil. In addition, the pins precisely position the coils to achieve orthogonality within a small tolerance and therefore optimize the omnidirectional electrical response of the tuned circuit array. Each coil has several pins holding it in alignment. There are pins on each side of the coil, with the pins being spaced apart from one another. The pins on one side of the coil are stationary, while the pins on the other side of the coil are retractable. The retractable pins for the vertical coils are actuated by pneumatic pistons 67. The stationary pins are fixed by plugs 69. Thus, after a coil has been placed into a mold cavity, and the pins have been actuated, the coil is maintained in the desired alignment by the pins on both sides. The horizontal coil has pins on both sides for both aligning the coil and for ejecting the subassembly out of the mold. The pins on one side of the horizontal coil are spring loaded. The retractable pins for the horizontal coil are operated by plates 71, each of which contacts all of the pins on one side of the horizontal coil. The plates 71 are operated in turn by pneumatic actuators 73. In addition, each plate 71 actuates a center pin 75 (see FIG. 4) in each mold block. The center pin 75 is also used to eject the subassembly from the mold.

To make the tuned circuit subassembly, the mold is opened. The mold release delivery system 47 moves to the extended position. The heads 55 on the mold release delivery system spray a mold release agent into the upper and lower mold cavities. The mold release agent, which is conventional and commercially available, assists in removing the subassembly from the mold cavities after the subassembly has been formed. After delivering the mold release agent, the mold release delivery system retreats to the retracted position.

The operator then places three tuned circuits 17 into the lower mold block. Each tuned circuit is placed in a respective disk cavity portion of the lower mold block. For example, one tuned circuit can be placed inside of another tuned circuit, and these two tuned circuits are then placed vertically into the lower mold block. Then, the third tuned circuit is placed over the other two and oriented horizontally in the lower mold block. The tapering in the mold channels makes for easy placement of the tuned circuits inside of the mold.

Then, the fluid delivery system 49 moves to the extended position and delivers a measured quantity of the foaming chemicals. Typically, just a few drops of the mixed foam chemicals are delivered into the bottom of the lower mold cavity.

After the foaming chemicals have been delivered to the mold, the first delivery system 49 retracts and the mold closes. The upper mold block 35 is lowered to the lower mold block 37. The pin actuators operate to extend the retractable pins 65. The pins contact the coils, wherein the coil alignment is fine adjusted.

The foaming chemicals have a short delay in foaming which is used for the closure of the mold. Foam is generated and fills the mold cavity. A port in the upper mold block allows air to be vented out of the cavity while the foam is expanding. The foam expands to fill the mold cavity, wherein the foam contacts the coils and the capacitors.

After expanding and filling the mold cavity, the mold is kept closed for a predetermined period of time. During this time, the foam cures by hardening and solidifying. After the requisite time has passed, the pins are retracted and the mold is opened. The retractable vertical pins are extended to pop the tuned circuit subassembly 13 out of the mold. The foam core maintains the tuned circuits in their proper and accurate alignment for placement in the housing and even inside of the housing.

The tuned circuit subassembly 13 is placed inside one of the housing portions. The other housing portion is then put on to form the housing. The housing portions are sealed together by heating the lips 29 of the two portions and then closing the two housing portions together so that the lips contact. After cooling, the housing portions are sealed together in a watertight or waterproof manner. The housing is also airtight.

Protrusions 77 can be formed in the foamed core 23 (see FIG. 1). The protrusions 77 are integral with and made up of the foam. When the housing portions are closed onto a tuned circuit subassembly, the protrusions are crushed by the inside of the housing portions. Thus, the tuned circuit subassembly is clamped within the housing and will not rattle inside. This also eliminates any mechanical shock that could result from the tuned circuits impacting the inside of the housing.

The marker 11 can be buried in the ground adjacent to a structure such as a pipeline or cable. The tuned circuits in the marker are electrically insulated from the exterior of the housing. One or more loops can be provided on the housing, which loops can be used to secure the marker to the structure.

The markers 11 are especially useful for locating pipe joints and cable splices, as well as plastic pipe and fiber optic cable.

The marker is light in weight and yet remarkably robust against mechanical shock. The light weight foam fills the interior of the housing and thus secures the tuned circuits in place. The foam protects the tuned circuits from mechanical shock. If the marker is dropped onto a hard surface, a common occurrence during shipping and installation into the ground, the tuned circuits remain operational.

The tuned circuit subassembly may be tested. It is preferable to test the tuned circuit subassembly before its installation into a housing. This is because if the tuned circuit subassembly is defective, it can be disposed of without disposing of a housing.

Testing the tuned circuit subassembly involves checking its response. A transmitted signal is provided at the proper frequency. The cumulative response of the tuned circuits is measured and checked for omnidirectionality.

The marker can be manufactured using other methods. One such method utilizes the tuned circuit subassembly 13. However, instead of placing the tuned circuit subassembly 13 inside of a housing, the housing is applied to the outside of the tuned circuit subassembly. For example, the housing or shell can be sprayed onto the tuned circuit subassembly. The shell is allowed to dry to provide a hard, watertight enclosure. Alternatively, the tuned circuit subassembly can be dipped into a liquid shell material, such as a low temperature thermoplastic. After dipping, the shell material is allowed to harden and form an environmental enclosure for the tuned circuits inside.

Still another method of manufacturing utilizes the housing as the mold. The tuned circuits, without foam, are located inside of the housing. The cavities in the housing are used to orient the tuned circuits with respect to each other. The foaming chemicals are then introduced into the interior of the closed housing through an orifice (or the foaming chemicals can be introduced into the housing before the housing is closed). The orifice is then sealed.

The above described procedures of making the marker can be done either manually or automatically.

The foregoing disclosure and showings made in the drawings are merely illustrative of the principles of this invention and are not to be interpreted in a limiting sense.

What is claimed is:

1. A passive marker for use in locating buried structures, comprising:

a) a tuned circuit comprising a coil of wire connected to a capacitance, the coil having an interior space;

b) the interior space of the coil comprising a rigid foam that is in contact with the coil;

c) a shell located around an exterior of the tuned circuit and the foam, the shell being waterproof, the tuned circuit being electrically insulated from an exterior of the shell.

2. The marker of claim 1 wherein the foam contacts the coil all around an inside diameter of the coil.

3. The marker of claim 1 wherein the foam at least partially encompasses the capacitance.

4. The marker of claim 1 wherein the shell is hard.

5. The marker of claim 1 wherein the shell compresses at least a portion of the foam when the shell is located around the tuned circuit in order to secure the tuned circuit inside of the shell.

6. The marker of claim 1 wherein:
   a) the foam contacts that coil all around an inside diameter of the coil;
   b) the foam at least partially encompasses the capacitance;
   c) the shell is hard;
   d) the shell compresses at least a portion of the foam when the shell is located around the tuned circuit in order to secure the tuned circuit inside of the shell.

7. A method of making a passive marker for locating buried structures, comprising the steps of:
   a) providing a tuned circuit comprising an inductance and a capacitance, the tuned circuit having an interior;
   b) placing the tuned circuit in a confined space;
   c) foaming the interior of the tuned circuit to fill the confined space;
   d) enclosing the foamed tuned circuit within a waterproof shell, the tuned circuit being electrically insulated from an exterior of the shell.

8. The method of claim 7 wherein:
   a) the step of placing the tuned circuit in a confined space further comprises the step of placing the tuned circuit inside of a mold and closing the mold;
   b) the step of foaming the interior of the tuned circuit to fill the confined space further comprises the step of foaming the inside of the mold;
   c) removing the foamed tuned circuit from the mold;
   d) the step of enclosing the foamed tuned circuit within a waterproof shell further comprises the step of placing the foamed tuned circuit into the shell and sealing the shell.

9. The method of claim 7 wherein:
   a) the step of placing the tuned circuit in a confined space further comprises the step of placing the tuned circuit inside of a mold and closing the mold;
   b) the step of foaming the interior of the tuned circuit to fill the confined space further comprises the step of foaming the inside of the mold;
   c) removing the foamed tuned circuit from the mold;
   d) the step of enclosing the foamed tuned circuit within a waterproof shell further comprises the step of coating the foamed tuned circuit with a protective covering material and allowing the protective covering material to harden.

10. A method of making a passive marker for locating buried structures, comprising the steps of:
    a) providing a tuned circuit comprising an inductance and a capacitance, the tuned circuit having an interior;
    b) placing the tuned circuit into a shell interior and closing the shell;
    c) foaming the interiors of the shell and the tuned circuit;
    d) sealing the shell in a waterproof manner, the tuned circuit being electrically insulated from an exterior of the shell.

11. A passive marker for use in locating buried structures, comprising:
    a) two or more tuned circuits, with each of the tuned circuits comprising an inductance and a capacitance, each of the inductances having a center and an axis extending through the center;
    b) the tuned circuits being concentric to each other and being oriented such that the axes are angled with respect to each other;
    c) the tuned circuits being coupled together in the orientation by foam;
    d) a shell formed around an exterior of the tuned circuits and the foam.

12. The marker of claim 11 wherein the tuned circuits are electrically insulated from an exterior of the shell.

13. The marker of claim 11 wherein the foam contacts all around an inside diameter of each of the tuned circuits.

14. The marker of claim 11, wherein the foam has a density ranging between 0.3–40 pounds per cubic foot.

15. The marker of claim 11 wherein:
    a) the tuned circuits are electrically insulated from an exterior of the shell;
    b) the foam contacts all around an inside diameter of each of the tuned circuits;
    c) the foam has a density ranging between 0.3–40 pounds per cubic foot.

16. The marker of claim 11 wherein:
    a) there are three tuned circuits that are orthogonal with respect to each other;
    b) the foam is rigid and in contact with inside diameters of each of the tuned circuits.

17. The marker of claim 16 wherein at least some of the foam is compressed by the shell.

18. A method of making a passive marker for use in locating buried structures, comprising the steps of:
    a) providing two or more tuned circuits, with each tuned circuit comprising a loop, each loop having an interior space;
    b) positioning the tuned circuits in a predetermined orientation with respect to each other such that a portion of the interior spaces are shared between the tuned circuits;
    c) filling the interior spaces with a foam, the foam making contact with the tuned circuits and maintaining the predetermined orientation, the foam being rigid;
    d) locating a shell around the tuned circuits and the foam.

19. The method of claim 18, wherein the step of positioning the tuned circuits in a predetermined orientation with respect to each other further comprises the step of positioning the tuned circuits in a mold and closing the mold.

20. The method of claim 19 wherein the step of positioning the tuned circuits in a mold further comprises the step of orienting the tuned circuit loops inside of the mold by retractable stops.

21. The method of claim 18 wherein:
    a) the step of positioning the tuned circuits in a predetermined orientation with respect to each other further comprises the step of placing the tuned circuits inside of a mold and closing the mold;
    b) the step of filling the interior spaces with a foam further comprises the step of foaming the inside of the mold;
    c) removing the foamed tuned circuits from the mold;
    d) the step of locating a shell around the tuned circuits and the foam further comprises the step of placing the foamed tuned circuits into the shell and sealing the shell.

22. The method of claim 18 wherein:
    a) the step of positioning the tuned circuits in a predetermined orientation with respect to each other further comprises the step of placing the tuned circuits inside of a mold and closing the mold;

b) the step of filling the interior spaces with a foam further comprises the step of foaming the inside of the mold;
c) removing the foamed tuned circuits from the mold;
d) the step of locating a shell around the tuned circuits and the foam further comprises the step of coating the foamed tuned circuits with a protective covering material and allowing the protective covering material to harden.

23. The method of claim 18 wherein:
a) the step of providing two or more tuned circuits further comprises providing three tuned circuits;
b) the step of positioning the tuned circuits in a predetermined orientation with respect to each other further comprises positioning the tuned circuits orthogonally and concentrically with respect to each other.

24. A method of making a passive marker for use in locating buried structures, comprising the steps of:
a) providing two or more tuned circuits, with each tuned circuit comprising a loop, each loop having an interior space;
b) positioning the tuned circuits in a shell interior, the tuned circuits being in a predetermined orientation with respect to each other such that a portion of the interior spaces are shared between the tuned circuits, and closing the shell;
c) foaming the interiors of the shell and the tuned circuits so as to contact the tuned circuits and the shell with the foam;
d) sealing the shell in a waterproof manner.

* * * * *